United States Patent [19]

Dana et al.

[11] Patent Number: 4,927,869

[45] Date of Patent: May 22, 1990

[54] CHEMICALLY TREATED GLASS FIBERS FOR REINFORCING POLYMERS

[75] Inventors: David E. Dana, Pittsburgh; Steven J. Morris, Freeport, both of Pa.

[73] Assignee: PPG Industries, Inc., Pittsburgh, Pa.

[21] Appl. No.: 245,099

[22] Filed: Sep. 15, 1988

[51] Int. Cl.$^5$ .............................................. C08K 3/20
[52] U.S. Cl. .................................... 523/502; 523/503; 523/504
[58] Field of Search ...................... 523/502, 503, 504; 428/391

[56] References Cited

U.S. PATENT DOCUMENTS

| | | | |
|---|---|---|---|
| 3,539,441 | 11/1970 | Rabenold | 161/170 |
| 3,597,265 | 8/1971 | Mecklenborg et al. | 117/126 |
| 3,923,708 | 12/1975 | Furukawa | 260/DIG. 15 |
| 3,969,299 | 7/1976 | Burns et al. | 427/269 |
| 4,029,623 | 6/1977 | Maaghul | 260/29.6 |
| 4,246,145 | 1/1981 | Molinier et al. | 525/102 |
| 4,305,742 | 12/1981 | Barch et al. | 427/178 |
| 4,309,326 | 1/1982 | Sage et al. | 428/391 |
| 4,330,444 | 5/1982 | Pollman | 523/404 |
| 4,338,234 | 7/1982 | Moore et al. | 523/206 |
| 4,390,647 | 6/1983 | Girgis | 523/212 |
| 4,394,418 | 7/1983 | Temple | 428/391 |
| 4,435,474 | 3/1984 | Das et al. | 428/391 |
| 4,436,848 | 3/1984 | Haines et al. | 523/426 |
| 4,473,618 | 9/1984 | Adzima et al. | 523/503 |
| 4,616,062 | 10/1986 | Brannon et al. | 524/601 |
| 4,752,527 | 6/1988 | Sanzero | 428/391 |
| 4,808,478 | 2/1989 | Dana et al. | 428/391 |
| 4,810,576 | 3/1989 | Gaa et al. | 428/391 |

FOREIGN PATENT DOCUMENTS

| | | |
|---|---|---|
| 1321847 | 2/1963 | France . |
| 55-3313 | 1/1980 | Japan . |
| 1590409 | 6/1981 | United Kingdom . |

OTHER PUBLICATIONS

Article *Water Soluble Polymeric Coupling Agents* by James G. Marsden and Enrico J. Pepe, 28th Annual Technical Conference, 1973, Reinforced Plastics/Composites Institute, The Society of the Plastics Industry, Inc., Section 11-F, pp. 1-4.

Technical brochure entitled *Union Carbide Film Forming Silanes Silylated Polyazamides.*

Brochure entitled *Emery Surfactants* from Emery Industries, Inc.

Technical data sheet on A-C polyethylene.

Technical brochure entitled *Polyox Water Soluble Resins are Unique.*

Technical leaflet from Savid Chemical Company, No. 211745-1982-MM Como, Italy, pp. 14-22 and 37-40.

*Primary Examiner*—Lewis T. Jacobs
*Attorney, Agent, or Firm*—Kenneth J. Stachel

[57] ABSTRACT

Chemically treated glass fibers of the present invention provide good processing properties in reinforcing thermosetting polymers while resulting in fiber reinforced thermosetting materials having good strength properties. The chemically treated glass fibers have a dried residue of an aqueous chemical treating composition having: two film forming polymers, at least an acryloxy alkyl trialkoxysilane, a fiber lubricant and polyester curing agent and water. One film forming polymer is a polyvinylacetate copolymer having a low solubility in acetone and the other film forming polymer is unsaturated, curable, essentially linear polyester polymer. The fiber lubricant is a nonionic polyethylene-containing polymer or a cationic lubricant like polyalkylene polyamine polyamino amide, and partially amidated polyalkylenimines and mixtures thereof present in an effective lubricating amount. The nonionic lubricant may be used and the cationic lubricant is used in conjunction with a fuzz reducing agent such as silylated polyazamide. Additional components which may be present include: an amino organofunctional silane coupling agent, and a polyoxyethylene polymer having a molecular weight in the range of 100,000 to 5 million. The dried residue is present on the fibers in the strand in an amount in the range of around 1.5 to 3 percent LOI. Also, the dried strands have a post treatment with an antistatic agent before the strands are utilized as reinforcement for thermosetting materials.

28 Claims, No Drawings

CHEMICALLY TREATED GLASS FIBERS FOR REINFORCING POLYMERS

The present invention relates to chemically treated (sized) glass fiber reinforcement for polymers like sheet molding compound (SMC), and bulk molding compounds (BMC) and the like.

Glass fiber reinforcement used in producing reinforced polymeric materials has various forms including chopped strands, continuous strands, chopped strand mat, continuous strand mat and the like. The glass fibers are produced from molten streams of glass issuing forth from small orifices in a bushing containing molten glass. The glass fibers cool and solidify and are treated with a chemical treatment (size) to arrest interfilament abrasion and to provide compatibility between the inorganic glass and the organic polymeric matrices. Afterwards, the glass fibers can be chopped, gathered into one or more strands for collection or for chopping. Collected continuous strand or strands on a forming package can be produced into roving by mounting a plurality of the glass fiber forming packages on a creel or support and gathering the strands from the separate packages in parallel to form a rope or roving. This braided rope or roving is wound on a rotating drum to collect the roving. Roving is chopped for a plurality of uses such as formation of a continuous strand mat or woven roving.

Chopped strands or roving have found particular utility in the area of glass fiber reinforced thermosetting molding compounds. The chopped glass fibers are dispersed throughout a thickened, polymerizable polyester resinous material that has a substantial viscosity in order that it may be handled by conventional techniques for producing molding compounds. An example of the preparation of such molding compounds is the preparation of SMC. This occurs by placing a film of polymer, usually unsaturated polyester or vinyl ester resin premix having such additives as catalysts, pigments, extenders and the thickeners on a sheet with a non-adhering surface. The film on the sheet has a uniform thickness and both travel on a conveyor belt to have chopped glass fiber roving uniformly deposited onto the polymer film. A second nonadhering sheet having a second polymer premix film is overlaid onto the first sheet so the second film contacts the first premix film with the glass fibers thereon. The sandwiched material is kneaded with a plurality of rollers having various configurations to uniformly distribute the glass fibers throughout the polymer premix. The sandwich is then taken up on a roll and can be used in subsequent molding operations. Typically, the glass fiber content in the sheet molding compound is anywhere between 25 and 45 weight percent of the compound.

The glass fibers used to reinforce thermosetting polymeric matrices must fulfill processing requirements for the glass fibers and product requirements for the glass fiber reinforced polymeric materials where some of these requirements may approach mutual incapability. The glass fiber roving must have adequate integrity to tolerate the processing necessary in forming the roving and in subsequent unwinding and chopping must have strand and fiber disassociation upon chopping of the roving so that they may uniformly disperse throughout the molding resin premix. In chopping the glass fibers should generate as little fuzz and static as possible. The chopped glass fibers must form a mat that results in adequate sheet loft of the mat and resin sheet to engender flowable material and to retard resin squeeze-out from too dense of a mat. In processing the reinforced polymeric material, the glass fibers must have adequate wet-out and wet-through in the polymeric matrix.

The production of uniform, low ripple and smooth surfaced molded composites of fiber reinforced thermosetting polymers is influenced by the solubility of the sizing composition on the glass fibers. If the sized glass fibers have a moisture-reduced sizing residue that is substantially insoluble in the matrix polymer, the majority of sized glass fiber strands remain intact rather than filamentizing into their component fibers. As previously mentioned, this integrity is desirable to avoid the formation of fuzzballs from filamentation of the strand from encountering the multitude of forces and conditions experienced during preparing molding compounds. The presence of fuzz balls results in a loss of smooth surface characteristics in the molded reinforced composite. At the same time in the processing of the molded compounds, the sized glass fiber strands should filamentize to become uniformly dispersed throughout the polymeric matrix.

It is an object of the present invention to provide sized glass fiber strands and rovings useful in producing fiber reinforced polymeric materials, where the fibrous reinforcement has balanced properties of wet-out and wet-through and integrity of the strands for processability and generates only low levels of fuzz and static, if any, during chopping and results in adequate sheet loft in mat-resin combinations.

It is a further object of the present invention to provide chemically treated glass fibers useful as reinforcement for thermosetting polymeric matrices, where the chemically treated fibers are less sensitive to thermal conditioning, therefore, being less susceptible to color changes due to thermal processing.

SUMMARY OF THE INVENTION

The aforementioned objects and other objects gleaned from the following disclosure are accomplished by the present invention. The present invention involves chemically treated glass fibers having a moisture-reduced residue of an aqueous chemical treating composition, hereinafter referred to as "residue" and "size", respectively. The size has only two water soluble, emulsifiable, or dispersible film forming polymers along with at least one compatible lubricant and at least a vinyl-containing organosilane coupling agent, a polyester curing agent and water. One of the polymers is a vinyl acetate copolymer having low solubility in acetone such as vinyl acetate-organo silane copolymer having up to about 1 weight percent of the organo silane or a vinyl acetate-methylolacrylamide copolymer. The other polymer is an unsaturated, essentially linear polyester. The combined amount of the two film forming polymers is an effective film-forming polymeric amount for the sized glass fibers, and the amount of the vinyl acetate copolymer in the size is predominant over that of the polyester. The lubricant is a water emulsifiable or dispersible polyethylene-containing polymer and/or a cationic polyamino amide and/or amidated polyalkyleneimines cationic lubricant in conjunction with a silylated polyazamide. The former is present in an amount ranging from an effective lubricating amount to an effective lubricating and fuzz reducing amount. The latter cationic lubricants are present in an effective lubricating amount while the silylated polyazamide is present in an effective fuzz reducing amount. The vinyl silane coupling agent is present in an effective coupling agent amount. The amount of the internal and/or external polyester curing agent is effective for at least partial curing of the polyester film forming polymer upon reduction of the moisture of the size in producing the residue on the glass fibers. In addition, the size may have a polyoxyethylene in an effective molecular weight and amount to function as a binder processing aid and an amino organosilane coupling agent in combination with the other silane coupler to give an effective coupling amount. The amount of water in the size is an effective amount to permit its application to the glass fibers during the formation of a plurality of glass fibers.

The application of the size to the glass fibers is in an effective amount to provide a residue of the size on the glass fibers in an amount up to around 3 weight percent of the sized strand with a moisture content of less than around 0.1 weight percent.

DETAILED DESCRIPTION OF THE INVENTION

In producing treated glass fibers for reinforcing polymeric materials the treated fibers need certain process characteristics and need to contribute to certain characteristics of the moldable glass fiber-containing polymeric sheet. The desired process characteristics include: ease of chopping to a uniform length (choppability); little accumulation of chopped glass on choppers (chopper buildup); a perceivable height of chopped fibers per unit weight (dry loft); reduced quantity of filaments which break off during processing that become air borne or build up at contact points (fuzz and fly); a degree of evenness and uniformity associated with the bed of mat of chopped glass fibers; and reduced generation of electrical charge on the glass fibers during processing (static). The desired sheet characteristics include: the ability of the SMC sheet to move uniformly under heat and pressure (flowability); a reduced percentage increase in sheet thickness after maturation of the polymer (spring back); a good no-load thickness per unit weight of SMC sheet as produced (wet loft); and good encapsulation level of strands by the polymer matrix of the sheet (wet out).

The wet-out is one measure of contact between the glass fibers and the polymeric matrix material directed to the flowability of the polymeric matrix material through the glass fiber strand mass to obtain near complete encapsulation of the entire surface of each glass fiber strand in the sheet or compound. Wet-out during compounding is a measure of the apparent intimacy of contact between the polymeric matrix and the glass fiber. If the glass fibers are not immediately wet-out, following compounding the possibility is slight that wet-out will occur on aging because of the increase in viscosity of the compound. If the glass fibers wet-out too quickly or to too high a degree, the strands may filamentize to too high a degree and produce entanglements and fuzzing in the matrix. Both of the latter situations may lead to adverse effects in the processability, molding characteristics and surface properties of the final molded reinforced polymeric material. Another measure of the proper contact is referred to as "wet-through" or "flow-through". This refers to the speed with which the matrix polymer can penetrate into the mass of glass fiber strands in compounding. It is desired to have a high degree of wet-through in molding compounds like SMC in order that the final physical properties of the molded composites and the processability thereof are at their maximum levels.

The sized glass fibers of the present invention result from sizing glass fibers during their formation with the size having in addition to water just the two types of film forming polymers, at least a vinyl-containing organofunctional silane coupling agent, at least one fiber lubricant which also functions to reduce fuzz and/or a separate fuzz reducing agent, and a polyester curing agent which is internal or external to the polyester film forming polymer. Also, the treating composition can have and preferably does have the separate fuzz reducing agent that is a silylated polyazamide and a binder lubricating material which is a polyoxyethylene polymer having a molecular weight of around 100,000 to 5 million number average molecular weight and a second aminofunctional organosilane coupling agent.

The sized glass fibers of the present invention involve the use of any fiberizable glass fiber composition manufactured by any known method for producing glass fibers. Preferably, the glass fibers are those of a "E-glass" or "621-glass" composition or any environmentally acceptable derivative thereof. Preferably the method of forming the glass fibers involves directly melting glass batch in a furnace and mechanically attenuating glass fibers from orifices in a bushing containing molten glass. The filament diameters of the glass fibers can be any filament diameter for continuous glass fibers, for instance, from less than 5 micrometers to around 30 micrometers or more, and any number of filaments may be combined to produce multifilament strands. During the formation of the glass fibers, the treating composition is applied to them, and the filaments are preferably wound as continuous strands into a forming package generally by any method known to those skilled in the art, for example, like that of U.S. Pat. No. 4,394,418 hereby incorporated by reference.

The poly(vinyl acetate) copolymer useful in the present invention is slightly crosslinked to have not more than a low degree of solubility in acetone according to a film swelling test. This test is conducted by casting a film of the copolymer on a glass slide and sandwiching the film on the slide with another slide, and clamping two opposite sides of the slides. The film area is measured, and the sandwich is dipped into acetone and removed. The change in the area of any swelled film is measured and recorded as a percentage change over the original area. A low percentage change occurs with a copolymer that is poly(vinylacetate silane) copolymer. Also, another type is vinyl acetate-methylolacrylamide copolymer that has such a low percentage change. The former preferably has up to about 1 weight percent of the copolymer as the organo silane, and most preferably around 0.25 weight percent of the copolymer. Larger amounts of organosilane may be used but without providing any additional advantages. A suitable copolymer is that which is available from National Starch and Chemical Corporation, Bridgewater, New Jersey, 08807, under the trade designation Resyn 1037 copolymer emulsion. This copolymer is in the form of a pre-cured microgel emulsion, where the copolymer is of vinyl acetate and gamma-methacryloxypropyl trimethoxy silane and has about 0.25 weight percent of the copolymer as the organosilane. The aqueous emulsion of this copolymer has a solid content of about 55 percent, a pH of 4.7 and an average particle size of around 1 micron and a viscosity measured according to RVF Brookfield No. 2 spindle at 20 rpms at 72° F. (22° C.) of 1225 centipoise and a mechanical stability in a Hamilton Beach mixer at 15 minutes of 10,000 rpm. A suitable example of the vinyl acetate-methylolacrylamide copolymer is the National Starch 25-2828 material. The effective amount of the copolymer is a predominant amount of the two film forming polymers present in the sizing composition and preferably in an amount of about 40 to about 90 weight percent of the nonaqueous components of the sizing composition.

The second film forming polymer present in the size is the unsaturated, essentially linear polyester polymer. By essentially linear, it is meant that there is little, if any, branching on the polymer chain so that the polydispersity index (Mw/Mn) is less than 10 and preferably less than 4. A suitable polyester is one in the form of an aqueous solution, emulsion or dispersion. A nonexclusive example of which is the solution available from Freeman Chemical Corporation under the trade designation Stypol 044-7009. The principal components of this polyester solution are the polyester resin and suitable surfactants in an amount of around 88 percent by weight and propylene glycol monomethyl ether present as a solvent in an amount of around 12 percent by weight. This solution has a boiling point of 121° C., a vapor pressure in millimeters of mercury of 8 millimeters at 25° C., and a vapor density of 3.1 where the vapor density of air is equal to 1. This solution is dispersible but is not soluble in water, and its specific gravity is greater than 1 and its percent volatiles is 21 percent while its evaporation rate is less than 1 where butyl acetate is equal to 1. This material appears as a pale yellow, high viscosity liquid having a flash point of 94° F. (34° C.) by the closed cup method. The acid number for the polyester ranges from around 45 to 55. The solution has a percent solids in the range of 84 to 88 and the unsaturated resin contains no copolymerizable monomer. Preferably, the polyester resin has a curing agent which is capable of thermoxidative curing present in the polyester resin solution or internally in the polyester resin backbone. An example of such a polyester resin is that described in U.S. Pat. No. 3,539,441 (Rabenold) hereby incorporated by reference. Any monomers for preparing the polyester resin and any method of its preparation known to those skilled in the art are useful in the present invention. For example, the components can be phthalic anhydride, maleic anhydride and propylene glycol, and in the case of an internal polyester curing agent, an amount of polyalkylene glycol can be used. The amount of the polyester resin as a resin or as a resin solution is always a minor amount to that of the vinyl acetate copolymer. Preferably the amount of the polyester resin is in the range of around at least 25 weight percent up to about 50 weight percent of the total amount of the film forming polymer present in the size. The total amount of the film forming polymer in the size is generally in the range of around 1 to 30 weight percent of the size taken as an aqueous composition.

In addition to the film forming polymers present, a polyester curing agent of the internal and/or external type is also present in the size. An example of an internal polyester curing agent is the aforementioned polyalkylene glycol present in the polymer backbone of the polyester. An example of the internal polyester curing agent is that of U.S. Pat. No. 3,539,441 (Rabenold) hereby incorporated by reference showing the polyethylene glycol (Carbowax materials) present in the polymer backbone. When external polyester curing agents are used, they also are usually of the thermoxidative curing type. It has been found that with the internal polyester curing agent the presence of a copolymerizable monomer adds no additional benefits to the present invention. With essentially linear polyester resins not having internal curing agents, any external curing agent should be polyfunctional to permit an adequate degree of cure. Generally, the curing agent is present in an effective amount to result in less than 100 percent thermoxidative cure of the unsaturated polyester. The polyester should be only partially cured so that there is some remaining unsaturation after the residue is formed on the glass fibers to enable chemical affiliation with the polymer matrix. Preferably, the amount of the internal curing agent is in the range of about 1 to 25 weight percent of the polyester composition on dried solids basis. With the use of an internal curing agent, which also functions as an internal emulsifier, use of too much of the internal curing agent could make the polyester too hydrophilic. This depends on the molecular weight of the polyester since higher molecular weight polyesters require more of the internal agent to effect hydrophilicity but use of too much could detrimentally effect the stability of the polyester.

The fiber lubricant present in a size is selected from an aqueous dispersible, emulsifiable or solubilizable polyethylene-containing polymer and/or an amidated polyamine and/or a pelargonic acid of tetraethylene pentamine and/or polyethylene imine. The preferred fiber lubricant is the polyethylene-containing polymer. Examples of which are disclosed in U.S. Pat. No. 4,394,418 (Temple) hereby incorporated by reference. A suitable polyethylene-containing polymer emulsion is available under the trade designation "Protolube HD" from Proctor Chemical Co. of National Starch, which material has a solids content of approximately 26 percent, a pH (1 percent solution) of approximately 8, and which has a milky emulsion appearance and an odor of mild wax. The amount of this fiber lubricant in the size is an effective lubricating and fuzz reducing amount. Preferably the amount is in the range of around 1 to around 5 weight percent of the solids of the size. A particularly useful cationic lubricant can be an amine salt of a fatty acid that has 4 to 26 carbon atoms and an even number of carbon atoms per molecule. The fatty acid moiety of the salt can have preferably between about 12 to about 22 carbon atoms. The amines useful for forming the salt are tertiary amines having a substantially low molecular weight, i.e., the allyl groups attached to the nitrogen atom should have between 1 and 6 carbon atoms. Also a solubilized fatty acid amide including both saturated and unsaturated fatty acid amides where the acid group contains from 4 to 24 carbon atoms can be employed. Also utilizable are the anhydrous acid solubilized polymers of low molecular weight unsaturated fatty acid amides. A particularly effective cationic lubricant suitable for use in the present invention is a pelargonic acid amide of tetraethylene pentamine sold by Imperial Chemical Industries under the trade designation Cirrasol 185-A which is a viscous liquid having a pH at 25° C. for a 2% solution of 8.5 to 9.5 and a total acidity of 12 to 14 percent.

When the lubricant is of the type that provides little, if any, fuzz reduction or in addition to the fuzz reducing effect of the fiber lubricant an additional fuzz reducing agent can be present in the size. Such an agent is silylated polyazamide (Si-PAA) available from Union Carbide Corp. under the trade designation Y-5922, Y-5923, Y-5986 and Y-5987. It is preferred to employ the Y-5987 Si-PAA material. A further description of useful (Si-PAA) is available in the U.S. Pat. Nos. 4,233,809 (Graham) and 3,746,738 (Pepe et al) and the article entitled "Water Soluble Polymeric Coupling Agents" by James G. Marsden and Enrico J. Pepe, 28th Annual Technical Conference, 1973, Reinforced Plastic/Composites Institute, The Society of Plastics Industry, Inc., Section 11-F, pages 1–4, all hereby incorporated by reference. The amount of the fuzz reducing agent is generally an amount that is effective in reducing tackiness of the sized strand as a strand is removed from a package of strands in a roving process. Preferably the amount is in the range of around 0.5 to 3 weight percent of the solids.

The size has at least a vinyl-containing organosilane like gamma-methacryloxyalkyl trialkoxy silane present as a coupling agent. A suitable example is gamma-methacryloxypropyltrimethoxy silane available from Union Carbide Corporation under the trade designation A-174. Also, there may be present a second organo silane coupling agent in combination with the first organo silane coupling agent. An amino functional organosilane coupling agent such as that available from Union Carbide Corporation under the trade designation A-1100 which is a gamma aminopropyltriethoxy silane is a suitable example. Either or both of these silanes can be present in unhydrolyzed, partially hydrolyzed or fully hydrolyzed products or a mixture thereof. The manner of hydrolyzing is any that is known to those skilled in the art. An effective coupling agent amount of the one or more organo silane coupling agents is in the range of 0.1 to 2 weight percent of the size and from about 1 to about 20 weight percent of the nonaqueous components of the size. Preferably, the methacryloxy-containing silane coupling agent is used in a predominant amount compared to the amino-organo silane coupler. The relative amounts of these coupling agents are 2 to 4 weight percent of the solids of the size for the methacryloxy-containing coupler and at least 0.5 weight percent solids of the amino-organo silane coupler.

Also, there may be present in the size a suitable polyoxyethylene (POE) polymer to function as a friction reducing agent for binder lubricity. A suitable polyoxyethylene polymer which can be used is available from Union Carbide under the trade designation POLYOX resins designated as WSR-1105 having a molecular weight of 900,000 or WSR-205 having a molecular weight of 600,000 or the WSRN-3,000 having a molecular weight of 400,000 or WSR 301 having a molecular weight of 4,000,000. The solution viscosity can be determined at 25° C. with a No. 1 spindle at 50 rpm. The POLYOX material is a water soluble resin which is nonionic and thermoplastic and it has a common structure of: $(-O-CH_2CH_2)-_n$ where the degree of polymerization, $n$, varies from about 2,000 to about 100,000. With the repeating unit having a molecular weight of 44, the polymer has a corresponding molecular weight in the range of about 100,000 to about 5,000,000 Mn. These materials are solids at room temperature, and they can have either a broad or narrow distribution of molecular weights. Their appearance is a white powder with a particle size as percent by weight through a No. 20 USBS sieve of 98 minimum, and they have: a melting point (crystal x-ray) of 65° C.; a volatiles content, as supplied by percent by weight of less than 1; an alkaline earth metals percent by weight of calcium oxide of 0.5; a powder bulk density of 24 pounds per cubic feet (117.2 kg/m$^2$); and a solution pH of 7–10. This POE is present in an amount in the range of about 0.05 to about 0.4 weight percent of the total solids of the size. Use of higher amounts leads to more viscous sizes. The POE can be dispersed or emulsified in water by any method known to those skilled in the art.

The size has an amount of water to produce a proper viscosity and solids level for application of the size to glass fibers during their formation. The total solids (nonaqueous components) of the size is about 1 to about 30 weight percent and preferably about 5 to 15 weight percent. Generally, the amounts of the solids should not exceed that amount which will cause the viscosity of the size to be greater than about 100 centipoise at 20° C. Viscosities of greater than 100 centipoise at this temperature make it difficult to apply the size to glass fibers during their formation without breaking the fibers. It is preferred that the viscosity of the size be between about 1 to 20 centipoise at 20° C. for best results.

The size is essentially free or devoid of imidazoline-containing cationic lubrications since they interfere with the cure of the polyester resin.

The size can be prepared adding any of the components simultaneously or sequentially to each other with a medium degree of agitation. The size's application to glass fibers is in such a manner to result in a moisture-reduced residue of the size on the fiber in the range of around 1.5 to around 3 weight percent based on the total weight of the fibers with the size. The application occurs during conventional forming processes of the fibers to produce the sized glass fiber strands at attenuation speeds to accommodate the addition of the proper amount of the size. Such an application is prior to the time the fibers are gathered together to form one or more strands and is by means of an applicator known in the art to permit contact of a liquid with solid object such as a roller applicator or belt applicator, partially submerged in the sizing composition contained in a reservoir such as the applicator shown in U.S. Pat. No. 2,728,972 which is hereby incorporated by reference. The fibers are gathered into one or more strands by a gathering shoe and wound onto a forming package rotating at a sufficient speed to attenuate the fibers from the orifices in the bushing of a glass fiber batch melting furnace and for addition of the proper amount of the size to the glass fibers. Other methods of applying the size to the fibers such as pad applicators may be employed. The amount of the moisture-reduced residue may be measured by the loss on ignition method (LOI).

The continuous glass fiber strands on forming packages are dried to reduce the moisture content of the strands by air drying or in any conventional drying ovens known to those skilled in the art at temperatures around 110° C. to 150° C. for around 11 hours. Although any time and temperature equivalent to the aforementioned may be used that give equivalent drying to remove a substantial amount of the moisture from the strands. The moisture content of the dried strands is usually less than around 0.06 weight percent and constitutes the glass fibers with the moisture-reduced chemical treatment as one aspect of the present invention.

The dried glass fiber strands are treated in a secondary treating step in a rewinding or roving operation or in an operation of unwinding the strands for preparation of a glass mat product with an antistatic agent. A suitable antistatic material is a liquid cationic material such as quaternary ammonium antistat such as Emerstat 6660 or Emerstat 6665 material both available from Emery Industries, Inc. The former is a 100 percent liquid cationic compound having a liquid pour point of less than zero, a viscosity of 900 CST at 100° F., a density of 8.8, a Gardner color of 6, a flash point of 325° F. and soluble in water and xylene and insoluble in mineral oil and Stoddard's solvent and dispersible in butyl stearate and glycerol trioleate. Preferably the dried glass fiber strands from a plurality of forming packages are unwound and treated with the antistat before winding the plurality of strands into a single roving package. Generally the type of antistat and its application can be performed with any antistat or by any process known to those skilled in the art. The rovings of glass fiber strands are useful in preparing glass mats and particularly chopped glass fiber strand mats for use in reinforcing thermosetting polymeric materials.

PREFERRED EMBODIMENT OF THE PRESENT INVENTION

A size composition having the formulation indicated below is applied to glass fibers during their formation where the fibers have a K filament diameter.

|  | lbs/100 Gallons | Weight % Solids of Size |
|---|---|---|
| poly(oxyethylene) polymer |  |  |
| Polyox WSR-301 polymer | 0.45 | 0.35 |
| water for polyox polymer | 15.8 gallons |  |
| gamma methacryloxypropyltrimethoxy silane (A-174) | 4.32 | 2.8 |
| acetic acid for A-174 silane | 0.055 |  |
| water for A-1100 | 2.5 gallons |  |
| gamma aminopropyltriethoxy silane (A-1100 coupler) | 2.4 | 1.08 |
| acetic acid | 1.1 |  |
| water | 2.5 gallons |  |
| poly(vinyl acetate-organosilane) |  |  |
| copolymer (Resyn ® 1037) | 134.2 | 57.1 |
| water for Resyn ® 1037 copolymer | 10.5 gallons |  |
| unsaturated, self-curing, essentially linear polyester resin with internal curing agent |  |  |
| (Stypol polyester) | 52.9 | 35.2 |
| water for Stypol polyester | 15.8 gallons |  |
| polyazamide organosilane |  |  |
| Y-5987 silane | 2.75 | 1.06 |
| acetic acid for 5987 silane | 0.08 gallons |  |
| polyethylene emulsion |  |  |
| protolube HD emulsion | 12.5 | 2.4 |
| water for wax emulsion | 4.2 gallons |  |
| water |  |  |
| deionized water | up to 100 gallons |  |

The aforedescribed formulation was prepared using only deionized water. Water at 85° F. (29.4° C.) for the polyox material was added to a premix tank. With rapid mixing the polyox WSR-301 was added in a steady stream onto the shoulder of the vortex. The mixing speed was reduced by half when all of the polyox material was added. The mixture of polyox and water was stirred until all lumps were gone and a solution was clear and the solution was transferred to the main mix tank. The acetic acid for the A-174 silane was added to ambient water which had a temperature of 85° F. (29.4° C.) in a premix tank. The A-174 silane was added to the premix tank with mixing and was stirred until clear and added to the main mix tank. Also, the acetic acid for the aminosilane was added to ambient water in a premix tank, and the aminosilane (A-1100) was added to the premix tank with stirring. The stirring was continued for 5 minutes, and the solution was added to the main mix tank. The amount of the polyvinylacetate silane copolymer was weighed and added to the main mix tank. The weighing vessel was then rinsed with ambient water, and the water was added to the main mix tank. The polyester solution was added to a premix tank, and with Eppenbach mixing ambient water was slowly added. Twenty percent of the water was added and mixing was conducted until the solution was uniform. The rest of the water in 20 percent increments was added by the same technique. When all the water was added, the diluted polyester solution was added to the main mix tank. The acetic acid was combined with ambient water to a premix tank and the Si-PAA was slowly added to the mixing acid solution and upon completion of the addition, the solution was added to the main mix tank. The polyethylene-containing polymer (Protolube HD) was diluted with ambient water in a premix tank and added to the main mix tank. Additional ambient water was added to achieve the desired volume of the size. The solids of the size ranges from 14.5 to 15.5 weight percent, and the pH ranges from 4.1 to 4.5 while the viscosity ranges from 4.4 to 4.6 centipoise as measured by a Brookfield LVT Number 1 at 30 rpm and at 78° F. (25.6° C.).

The size was applied to the glass fibers having a K filament diameter during the formation of 2K-37 strands to achieve an amount of dried residue of the size on the strands in the range of about 1.9 to 2.3 percent as measured by loss on ignition (LOI). This application was achieved by controlling the applicator belt speed and also the attenuation speed of the fibers during their formation. The strands were wound onto forming packages. A plurality of the forming packages were dried in a forced air oven at a temperature in the range of around 280°–290° F. (138°–143° C.) for a period of time in the range of 10.75 to 11.25 hours.

A plurality of the dried forming packages were roved into a roving package on a roving winder with the application of the quaternary ammonium antistat to the strands just prior to take-up by the roving winder. The antistat is the Emerstat 6660 material at 35 percent solids in water which was prepared by adding 2,000 grams of warm water (120° F.) (49° C.) to a premix tank along with 1,312 grams of the Emerstat 6660 material. The latter was added with stirring to the water until the material dissolved. The antistat material was applied at a rate in the range of around 1.5 to 2.5 grams per minute. After the forming package is paid out and the roving package was complete, a plurality of roving packages were post-baked in a tunnel oven for a time in the range of around 1 to 2 hours at a temperature in the range of 250°–260° F. (121°–127° C.). The dried roving packages are useful in preparing chopped glass fiber strands in any SMC production process known to those skilled in the art.

Example 1 presents an alternative embodiment, where the size was prepared in a manner similar to that of the preferred embodiment except for the different amount of the polyethylene polymer.

| Components | (Lbs/100 Gallons/ Weight % Solids) |
|---|---|
| poly(oxyethylene) polymer | 0.45/.35 |
| (Polyox WRS-301) water (gal/l) | 15.8/ |
| gamma methacryloxy propyltrimethoxy |  |

-continued

| Components | (Lbs/100 Gallons/ Weight % Solids) |
|---|---|
| silane | |
| A-174 | 4.32/2.8 |
| Acetic acid/water (gal/l) | 0.055/8.0 |
| gamma aminopropyltriethoxy silane | |
| (A-1100 coupler) | 2.4/1.1 |
| acetic acid/water (gal.) | 1.1/2.5 |
| poly(vinyl acetate-organosilane) copolymer | |
| Resyn 1037 | 134.2/57.8 |
| Water (gal) | 10.5/ |
| polyester resin (Stypol polyester) | 52.9/35.6 |
| water (gal) | 15.8/ |
| polyazamide organosilane (y-5974) | 2.75/1.08 |
| acetic acid/water (gal) | 0.08/2.6 |
| polyethylene-containing polymer emulsion | 6.25/1.2 |
| water (gal) | 2.1/ |
| water for desired volume (gal) | to 100/378.5 |

Table 1 presents 3 examples of sized glass fibers in the preparation of SMC sheets and the performance properties of the fibers and the strength properties of the SMC panels. Example 1 refers to the two K-37 strands having the dried residue of a size Example 1 prepared into a roving by the process of the preferred embodiment. Illustrative Example 1 (Ill. Eg. 1) is a roving strand prepared in accordance with the teachings of U.S. Pat. No. 4,338,234 and Illustrative Example 2 (Ill. Eg. 2) is commercially available fiber glass roving product.

TABLE 1

Performance Properties of Sized Glass Fibers

| Example Numbers | 1 | Ill. Eg. 1 | Ill. Eg. 2 |
|---|---|---|---|
| (I) Processing of Sheet Molding Compounds (SMC): | | | |
| End count of strands | 47 | 43 | 48 |
| Static (Volts/millimeter) | 70 | −200 | 70 |
| Chopper Cling | 0 | moderate | 0 |
| Chopping Fuzz | negligible | moderate | low to mod. |
| Wet-Through of glass in matrix resin (%) | 90 | 95 | 95 |
| Wet-Out in matrix resin (%) | 100 | 100 | 100 |
| Sheet Loft (inches/mm) | 0.220[1] | 0.265[2] | 0.225[3] |
| (II) Properties of SMC Panels: | | | |
| Tensile Strength in KSI | 10.9 | 10.0 | 10.2 |
| Impact Strength (ft-lbs/in) | 17.5 | 16.3 | 17.2 |
| Flexural Strength (KSI) | 24.0 | 25.5 | 23.0 |
| Flexural Modulus ($\times 10(6)$) | 1.42 | 1.48 | 1.4 |

[1] An average of a number of samples tested over a 6-month period where the number of samples tested was 15.
[2] An average of a number of samples tested over a 6-month period where the number of samples tested was 10.
[3] An average of a number of samples tested over a 6-month period where the number of samples tested was 23.

For Table 1 the SMC panels were prepared with a filled, non-thickened polyester resin system having standard components and a viscosity of 55,000 centipoise at 90° F. (32.2° C.). The fiber glass content was 28–29 percent, and the SMC sheet weight was 22 oz (623.7 gm). The line speed of forming the SMC sheet with chain mesh compaction was 15 feet/min. (4.57 m/min.). Table 1 shows the sized glass fibers from the present invention have better processability than Illustrative Example 1 in reduced static, chopper clink, chopping fuzz and sheet loft and better processability than Illustrative Example 2 in reduced chopping fuzz. The improved processability was achieved while maintaining good strength properties of the SMC panels as compared to both illustrative examples.

Table 2 shows the performance by wet-out, wet-through and sheet loft of sized fibers where the size had a varying ratio of the polyester film forming polymer and the polyvinyl acetate copolymer film forming polymer. From this study it was derived that at least 25 weight percent of the film forming material in the size must be the polyester but the polyvinylacetate copolymer must be the predominant amount of the film former.

TABLE 2

Performance of Chemically Treated Glass Fibers in SMC Processing with Variations in the Ratio of the Two Film Forming Polymers

| Examples | Ratio PE/PVco | PB °F. | Wet-Out | Wet-Through | Sheet Loft (inch) |
|---|---|---|---|---|---|
| A | 0/1 | 300 | 80 | 70 | 0.115 |
| B | 1/0 | 300 | 95 | 100 | 0.3 |
| C | 50/50 | 270 | 93 | 95 | 0.255 |
| D | 50/50 | 300 | 97 | 100 | 0.305 |
| E | 1/0 | 270 | 97 | 100 | 0.31 |
| F | 0/1 | 240 | 80 | 75 | 0.13 |
| G | 50/50 | 240 | 95 | 90 | 0.17 |
| H | 1/0 | 240 | 95 | 100 | 0.280 |

In Table 2 the abbreviations have the following meanings: "PB" is "pre-bake" temperature, "PE" is the polyester film forming polymer, and "PVco" is the polyvinylacetate copolymer with the methacryloxypropyltrimethoxy silane (M-silane). In addition to the two film forming polymers the aqueous treating composition contained two additional components. These were gamma-aminopropyltriethoxysilane ("Aminosilane") (A-1100) and M-silane.

In both Tables 1 and 2, differences in wet out were forced to be other than 100 percent to rank the other characteristics shown in the tables.

The foregoing examples indicate the improved processability of the present invention while achieving good sheet loft and good strength properties of SMC materials.

I claim:

1. An aqueous chemical treating composition for fibrous inorganic oxide surfaces, comprising:
    a. two film forming polymers selected from water soluble, emulsifiable, or dispersible unsaturated, essentially linear polyester and from water soluble, emulsifiable, or dispersible vinyl acetate copolymer having low solubility in acetone selected from the group consisting of vinyl acetate-organo silane copolymer, and vinyl acetate-methylolacrylamide copolymer, where the two polymers are present as the only film forming polymers and present in a combined amount in the range of around 1 to 30 weight percent of the aqueous composition as an effective film forming polymeric amount, wherein the vinyl acetate copolymer is present in a predominant amount of the two film forming polymers,
    b. acryloxy alkyltrialkoxy silane coupling agent selected from the group consisting of unhdyrolyzed silane, partially hydrolyzed and fully hydrolyzed derivatives thereof and mixtures thereof present in an effective coupling agent amount, and
    c. polyester polymer curing agent selected from internal and external thermal oxidative curing agents in an effective amount to cure the polyester to less than its full extent, d. fiber lubricant selected from the group consisting of nonionic, water soluble polyethylene-containing polymer and cationic lubricants selected from the group consisting of polyalkylene polyamine, polyamino amide and partially amidated polyalkyleneimines and mixtures thereof in an effective lubricating amount, e. silylated polyazamide present in an amount ranging from 0 when the polyethylene-containing polymer is the fiber lubricant to an effective fuzz reducing amount when the cationic lubricant is the fiber lubricant, and f. water present in an effective amount to give a total solids content for the aqueous chemical treating composition ranging from around 1 to around 30 weight percent.

2. Composition of claim 1, including at least one amino organo functional silane coupling agent selected from the group consisting of unhydrolyzed silane, partially hydrolyzed silane and fully hydrolyzed silane and mixtures thereof in an effective coupling agent amount.

3. Composition of claim 1, which includes polyoxyethylene having a molecular weight in the range of 100,000 to 5,000,000 in an effective friction reducing amount.

4. Composition of claim 1, wherein the acryloxyalkyltrialkoxy silane is methacryloxypropyltrialkoxy silane selected from unhydrolyzed silane and hydrolyzed products thereof and mixtures thereof.

5. Composition of claim 4, wherein the polyethylene is a high density polyethylene.

6. Composition of claim 1, wherein the polyester curing agent is polyethylene glycol present as an internal emulsifier for the polyester to provide for selfcuring of the polyester through thermal oxidative reaction.

7. Composition of claim 1, wherein the polyester curing agent is polyfunctional for thermal oxidative reaction with the polyester polymer.

8. Composition of claim 1, wherein the composition is essentially free of styrene and quaternary organic compounds the latter of which interferes with thermal oxidative curing of polyester.

9. Composition of claim 1, wherein the amount of the polyester present is in the range of at least 25 and up to around 50 weight percent of the film forming polyester.

10. Composition of claim 1, wherein the amount of silylated polyazamide is at least around 10 grams per gallon when the solids content is around 15 weight percent.

11. Composition of claim 1, where when the polyethylene-containing polymer is present, silylated polyazamide is present in an effective fuzz reducing amount.

12. Composition of claim 11, wherein the amount of silylated polyazamide is at least around 10 grams per gallon when the solids content of the composition is around 15 weight percent.

13. An aqueous chemical treating composition for fibrous inorganic oxide surfaces, comprising:
a. two film forming polymers selected from water soluble, emulsifiable, or dispersible unsaturated, self-curing, and essentially linear polyester and from water soluble, emulsifiable, or dispersible vinyl acetate copolymer having low solubility in acetone selected from the group consisting of vinyl acetate-organo silane copolymer, and vinyl acetate-methylolacrylamide copolymer, where the two polymers are present as the only film forming polymers and present in a combined amount in the range of around 1 to 30 weight percent of the aqueous composition as an effective film forming polymeric amount, wherein the vinyl acetate copolymer is present in a predominant amount to that of the polyester and wherein the amount of the polyester present is in the range of at least 25 and up to around 50 weight percent of the film forming polymers, b. acryloxy alkyltrialkoxy silane coupling agent selected from the group consisting of unhydrolyzed and hydrolyzed products thereof and mixtures of same present in an effective coupling agent amount, and c. silylated polyazamide wherein the amount of silylated polyazamide is at least around 10 grams per gallon when the solids content is around 15 weight percent, d. fiber lubricant selected from the group consisting of water soluble polyethylene-containing polymer, and polyalkylene polyamine, polyamino amide, and partially amidated polyalkylenimines present in an effective lubricating amount, and e. water present in an effective amount to give a total solids content for the aqueous chemical treating composition ranging from 1 to about 30 weight percent.

14. Composition of claim 13, wherein the polyester is internally emulsified with polyethylene glycol which also provides for selfcuring of the polyester through thermal oxidative reaction.

15. Composition of claim 13, wherein the composition is essentially free of styrene and quaternary organic compounds that interfere with thermal oxidative curing of polyester.

16. Composition of claim 13, including at least one amino organo functional silane coupling agent selected from the group consisting of unhydrolyzed and hydrolyzed products thereof and mixtures of same in an effective coupling agent amount.

17. Composition of claim 13, which includes polyoxyethylene polymer having a molecular weight in the range of 100,000 to around 5,000,000 in an effective friction reducing amount.

18. Composition of claim 13, wherein the acryloxyalkyltrialkoxy silane is methacryloxypropyltrialkoxy silane selected from the group consisting of unhydrolyzed and hydrolyzed products thereof and mixtures of same.

19. Composition of claim 13, wherein the polyethylene is a high density polyethylene.

20. Composition of claim 1, wherein the vinyl acetate copolymer film forming polymer is present in an amount in the range of about 40 to about 90 weight percent of the nonaqueous components of the composition.

21. Composition of claim 1, wherein the polyester film forming polymer is cured to less than 100 percent of a thermooxidative cure to result in a residue on the inorganic oxide surfaces to enable chemical affiliation with the polymer matrix.

22. Composition of claim 1, wherein the fiber lubricant is essentially free of imidazoline-containing cationic lubricants.

23. Composition of claim 6, wherein the internal emulsifier for self-curing polyester is present in an amount in the range of about 1 to 25 weight percent of the polyester composition on a dried solids basis but less than that amount to make the polyester hydrophilic to the degree of detrimentally affecting the stability of the polyester.

24. Composition of claim 13, wherein the vinyl acetate copolymer film forming polymer is present in an amount in the range of about 40 to about 90 weight percent of the nonaqueous components of the composition.

25. Composition of claim 13, wherein the polyester film forming polymer is cured to less than 100 percent of a thermooxidative cure to result in a residue on the inorganic oxide surfaces to enable chemical affiliation with the polymer matrix.

26. Composition of claim 13, wherein the fiber lubricant is essentially free of imidazoline-containing cationic lubricants.

27. Composition of claim 14, wherein the internal emulsifier for self-curing polyester is present in an amount in the range of about 1 to 25 weight percent of the polyester composition on a dried solids basis but less than that amount to make the polyester hydrophilic to the degree of detrimentally affecting the stability of the polyester.

28. An aqueous chemical treating composition for glass fiber surfaces, comprising:
   a. two film forming polymers selected from i) water soluble, emulsifiable, or dispersible unsaturated, self-curing, and essentially linear polyester that is self-curing through internal emulsification with polyethylene glycol, wherein the internal emulsifier is present in an amount in the range of about 1 to 25 weight percent of the polyester composition on a dried solids basis, but is present in an amount less than that amount to make the polyester hydrophilic to the degree of detrimentally affecting the stability of the polyester; and ii) water soluble, emulsifiable, or dispersible vinyl acetate copolymer having low solubility in acetone selected from the group consisting of vinyl acetate-organo silane copolymer, and vinyl acetatemethylolacrylamide copolymer, and where the two polymers are present as the only film forming polymers and present in a combined amount in the range of around 1 to 30 weight percent of the aqueous composition as an effective film forming polymeric amount, wherein the vinyl acetate copolymer is present in an amount in the range of about 40 to about 90 weight percent of the nonaqueous components of the composition and in a predominant amount to that of the polyester, and wherein the amount of the polyester present is in the range of at least 25 and up to around 50 weight percent of the film forming polymers,
   b. acryloxy alkyltrialkoxy silane coupling agent selected from the group consisting of unhydrolyzed methacryloxy-containing silane coupling agent and amino-organo silane coupling agent and hydrolyzed products thereof and mixtures thereof present in an amount in the range of about 1 to about 20 weight percent of the nonaqueous components, wherein the methacryloxy-containing silane coupling agent is present in a predominant amount to that of the amino-organo silane, and
   c. silylated polyazamide wherein the amount of silylated polyazamide is at least around 10 grams per gallon when the solids content is around 15 weight percent,
   d. fiber lubricant selected from the group consisting of water soluble high density polyethylene-containing polymer, and polyalkylene polyamine, polyamino amide, and partially amidated polyalkylenimines, wherein the fiber lubricant is essentially free of imidazoline-containing cationic lubricants, and wherein the lubricant is present in an amount in the range of around 1 to 5 weight percent of the solids of the composition,
   e. polyoxyethylene polymer having a molecular weight in the range of 100,000 to around 5,000,000 in an effective friction reducing amount, and
   f. water present in an effective amount to give a total solids content for the aqueous chemical treating composition ranging from 5 to about 15 weight percent, and wherein the composition is essentially free of styrene and quaternary organic compounds the latter of which interferes with thermal oxidative curing of polyester.

* * * * *